US00RE47463E

(19) United States
(12) Reissued Patent
Liu et al.

(10) Patent Number: US RE47,463 E
(45) Date of Reissued Patent: Jun. 25, 2019

(54) SYSTEM AND METHOD FOR DYNAMIC CELL SELECTION AND RESOURCE MAPPING FOR COMP JOINT TRANSMISSION

(71) Applicant: Samsung Electronics Co., Ltd., Suwon-si, Gyeonggi-do (KR)

(72) Inventors: Lingjia Liu, Overland Park, KS (US); Jianzhong Zhang, Plano, TX (US)

(73) Assignee: Samsung Electronics Co., Ltd., Suwon-si (KR)

(21) Appl. No.: 14/260,029

(22) Filed: Apr. 23, 2014

Related U.S. Patent Documents

Reissue of:
(64) Patent No.: 8,274,951
Issued: Sep. 25, 2012
Appl. No.: 12/716,144
Filed: Mar. 2, 2010

U.S. Applications:
(60) Provisional application No. 61/210,291, filed on Mar. 17, 2009.

(51) Int. Cl.
*H04W 4/00* (2018.01)
*H04L 12/26* (2006.01)
*H04L 5/00* (2006.01)

(52) U.S. Cl.
CPC ..... *H04L 43/045* (2013.01); *H04L 5/0035* (2013.01); *H04L 5/0048* (2013.01); *H04L 5/0073* (2013.01); *H04L 5/0094* (2013.01)

(58) Field of Classification Search
CPC ..... H04L 43/045; H04L 5/00; H04L 5/0048; H04L 5/0073; H04L 5/0094; H04L 5/0035; H04L 5/0091
(Continued)

(56) References Cited

U.S. PATENT DOCUMENTS 7,372,830 B2 5/2008 Jung et al.
7,602,843 B2 * 10/2009 Cho et al. ..... 375/228
(Continued)

FOREIGN PATENT DOCUMENTS

EP 1 916 778 A2 4/2008
KR 1020090013140 A 2/2009

OTHER PUBLICATIONS

Supplementary European Search Report dated Jul. 28, 2016 in connection with the European Patent Application No. EP 10 75 3692.

(Continued)

*Primary Examiner* — Ovidio Escalante

(57) ABSTRACT

A wireless communication system includes a number of base stations capable of communicating with a plurality of subscriber stations. The base station coordinates transmission of resource blocks with a transmission of resource blocks from a second base station. The resource blocks include at least one reference signal (RS) patterns. In addition, base station punctures a plurality of resource elements in the resource blocks that might overlap with one of the CRS patterns in another resource block transmitted by the second base station such that no data is transmitted in the plurality of punctured resource elements. The subscriber station receives the resource blocks from at least two base stations and can avoid reading data from the resource elements that might overlap.

17 Claims, 15 Drawing Sheets

(58) Field of Classification Search
USPC ..... 370/332, 349
See application file for complete search history.

(56) References Cited

U.S. PATENT DOCUMENTS

| | | | | |
|---|---|---|---|---|
| 7,995,662 | B2 * | 8/2011 | Vannithamby | 375/260 |
| 8,406,171 | B2 * | 3/2013 | Onggosanusi | H04B 7/024 370/328 |
| 8,644,408 | B2 * | 2/2014 | Gorokhov | H04L 1/0026 375/259 |
| 2007/0026810 | A1 * | 2/2007 | Love et al. | 455/67.11 |
| 2007/0248113 | A1 | 10/2007 | Ko et al. | |
| 2008/0316950 | A1 * | 12/2008 | Damnjanovic | H04W 52/34 370/311 |
| 2010/0091892 | A1 * | 4/2010 | Gorokhov | H04L 1/0026 375/260 |
| 2010/0103821 | A1 * | 4/2010 | Palanki | H04W 36/0055 370/241 |
| 2010/0177746 | A1 * | 7/2010 | Gorokhov | H04B 7/024 370/336 |
| 2010/0290382 | A1 * | 11/2010 | Hui et al. | 370/312 |
| 2011/0269449 | A1 * | 11/2011 | Kazmi | H04B 7/024 455/422.1 |
| 2011/0269459 | A1 * | 11/2011 | Koo | H04W 24/10 455/434 |
| 2012/0282966 | A1 * | 11/2012 | Koo | H04L 1/0026 455/517 |

OTHER PUBLICATIONS

LG Electronics, "CoMP Configurations and UE/eNB Behaviors in LTE-advanced," Feb. 9-13, 2009, pp. 4, 3GPP TSG RAN WG1 Meeting #56, Athens, Greece.

International Search Report dated Oct. 25, 2010 in connection with International Patent Application No. PCT/KR2010/001644.

* cited by examiner

SYSTEM AND METHOD FOR DYNAMIC CELL SELECTION AND RESOURCE MAPPING FOR COMP JOINT TRANSMISSION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION(S) AND CLAIM OF PRIORITY

The present application is [related to] *an application for reissue of U.S. Pat. No. 8,274,951 issued Sep. 25, 2012 on U.S. Non-Provisional patent application Ser. No. 12/716,144 filed Mar. 2, 2010, and claims the priority to and the benefit under 35 U.S.C. § 119(e) of the filing date of* U.S. Provisional Patent Application No. 61/210,291, filed Mar. 17, 2009, entitled "DYNAMIC CELL SELECTION FOR CoMP REPORTING SET AND TRANSPARENT RESOURCE MAPPING FOR CoMP JP". [Provisional Patent Application No. 61/210,291 is assigned to the assignee of the present application and] *The content of the above-identified patent documents* is hereby incorporated by reference into the present application as if fully set forth herein. [The present application hereby claims priority under 35 U.S.C.§119(e) to U.S. Provisional Patent Application No. 61/210,291.]

TECHNICAL FIELD OF THE INVENTION

The present application relates generally to wireless communications and, more specifically, to dynamic cell selection and resource mapping in wireless communications networks.

BACKGROUND OF THE INVENTION

In a wireless communications network, multiple cells or base stations (also referred to as "eNBs") use frequency bands and standardized codebooks for precoding transmission to their respective user equipments (UEs), using multiple transmit antennas. A typical problem of this procedure occurs where several cells or base stations are serving their intended UEs while interfering with each other's signal. This scenario is called "inter-cell interference." Inter-cell interference constrains the throughput of the wireless network.

SUMMARY OF THE INVENTION

A base station capable of communicating with a plurality of subscriber stations is provided. The base station includes a plurality of antenna configured to transmit data and control information and a transmitter coupled to the plurality of antenna. The transmitter is configured to transmit a plurality of symbols in a sub-frame to a subscriber station. The base station also includes a controller configured to include a bitmap in a downlink control information (DCI). The bitmap is configured to inform the subscriber station regarding a subset of cells within a CoMP measurement set for channel quality information reporting.

A subscriber station capable of communicating with a plurality of base stations is provided. The subscriber station includes a plurality of antenna configured to receive data and control information and a receiver coupled to the plurality of antenna. The receiver is configured to receive a plurality of symbols in a sub-frame from a base station. The subscriber station also includes a controller configured to interpret a bitmap in a downlink control information (DCI). The bitmap is configured to identify a subset of cells within a CoMP measurement set for channel quality information reporting.

A method for communicating with a plurality of subscriber stations is provided. The method includes transmitting, to a subscriber station, a plurality of symbols in a sub-frame and including a bitmap in a downlink control information (DCI). The bitmap is configured to inform the subscriber station regarding a subset of cells within a CoMP measurement set for channel quality information reporting.

A base station capable of communicating with a plurality of subscriber stations is provided. The base station includes a plurality of antenna configured to transmit data and control information. The base station also includes a transmitter coupled to the plurality of antenna. The transmitter is configured to transmit a first resource block to a subscriber station. The base station further includes a controller configured to coordinate transmission of the first resource block with a transmission of at least one additional resource block that is transmitted from at least one additional base station to the subscriber station. The transmissions of the first and at least one additional resource blocks are coordinated such that the subscriber station receives single resource block that comprises at least one of the first and the at least one additional resource block. The first and at least one additional resource blocks include at least one reference signal (RS) pattern. The controller is configured to puncture a plurality of resource elements in the first resource block that might overlap with one of the RS patterns in one or more of the additional resource block(s) such that no data is transmitted in the plurality of punctured resource elements.

A subscriber station capable of communicating with a plurality of base stations is provided. The subscriber station includes a plurality of antenna configured to receive data and control information and a receiver coupled to the plurality of antenna. The receiver is configured to receive a single resource block. The single resource block includes at least one of: a first resource block received from a first base station; and at least one additional resource block received from at least one additional base station. The first and at least one additional resource blocks include at least one reference signal (RS) pattern. The receiver is configured to not expect data in a plurality of punctured resource elements in the first resource block that might overlap with one of the at least one RS pattern in one or more of the at least one additional resource block.

A method for communicating with a plurality of subscriber stations is provided. The method includes transmitting a first resource block to a subscriber station and coordinating the transmission of the first resource block with a transmission of at least one additional resource block from at least one additional base station to the subscriber station such that the subscriber station receives single resource block that includes at least one of the first and the at least one additional resource block. The first and at least one additional resource blocks comprise at least one reference signal (RS) patterns. The method also includes puncturing a plurality of resource elements in the first resource block that might overlap with one of the at least one RS patterns in the at least one additional resource block such that no data is transmitted in the plurality of resource elements in the first resource block that might overlap with one of the at least one RS patterns in the at least one additional resource block.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the LTE term "node B" is another term for "base station" used below. Further, the term "cell" is a logic concept that can represent a "base station" or a "sector" belongs to a "base station". In the present disclosure, "cell" and "base station" are used interchangeably to indicate the actual transmission units (may be "sector" or "base station" and the like) in the wireless system. Also, the LTE term "user equipment" or "UE" is another term for "subscriber station" used below.

With regard to the following description, it is noted that the discussion is focused on reference signals (RS) including common reference signals (CRS), channel state information reference signals (CSI-RS), and the like. The collision between CRS and PDSCH discussed in the document is for illustration purpose, however, the collision between reference signal resource elements and PDSCH resource elements will occur for any type of reference signals.

Figure 1A:
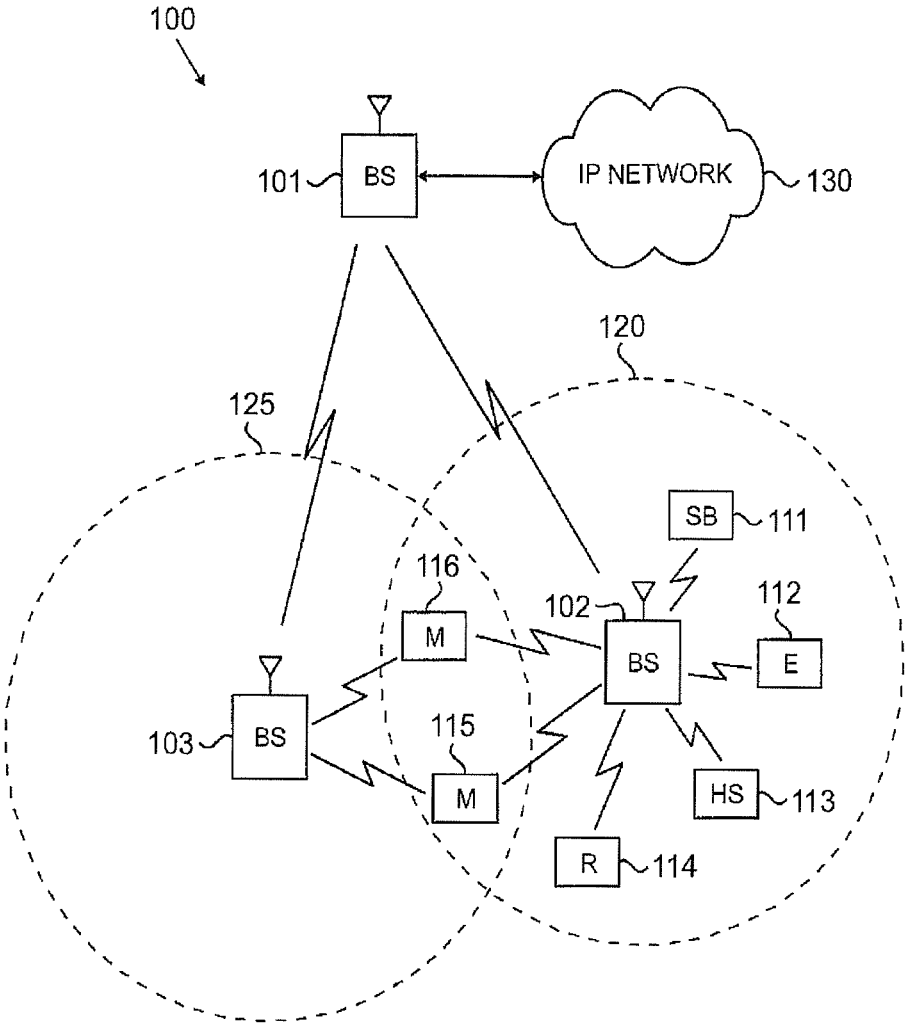
FIG. 1A illustrates exemplary wireless network 100 that is capable of decoding data streams according to an exemplary embodiment of the disclosure.

FIG. 1A illustrates exemplary wireless network 100 that is capable of decoding data streams according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. Subscriber station (SS) may be any wireless communication device, such as, but not limited to, a mobile phone, mobile PDA and any mobile station (MS). In an exemplary embodiment, SS 111 may be located in a small business (SB), SS 112 may be located in an enterprise (E), SS 113 may be located in a WiFi hotspot (HS), SS 114 may be located in a residence, SS 115 may be a mobile (M) device, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet or other controller unit by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1A, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be cell-edge devices interfering with each other. For example, the communications between BS 102 and SS 116 may be interfering with the communications between BS 103 and SS 115. Additionally, the communications between BS 103 and SS 115 may be interfering with the communications between BS 102 and SS 116.

In an exemplary embodiment, base stations 101-103 may communicate with each other and with subscriber stations 111-116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight or non-line-of-sight with base station 102 and base station 103, depending on the technology used for the wireless backhaul. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber station 114 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1A. In another embodiment, the connection to network 130 may be provided by different network nodes and equipment.

In accordance with an embodiment of the present disclosure, one or more of base stations 101-103 and/or one or more of subscriber stations 111-116 comprises a receiver that is operable to decode a plurality of data streams received as a combined data stream from a plurality of transmit antennas using an MMSE-SIC algorithm. As described in more detail below, the receiver is operable to determine a decoding order for the data streams based on a decoding prediction metric for each data stream that is calculated based on a strength-related characteristic of the data stream. Thus, in general, the receiver is able to decode the strongest data stream first, followed by the next strongest data stream, and so on. As a result, the decoding performance of the receiver is improved as compared to a receiver that decodes streams in a random or pre-determined order without being as complex as a receiver that searches all possible decoding orders to find the optimum order.

Figure 1B:
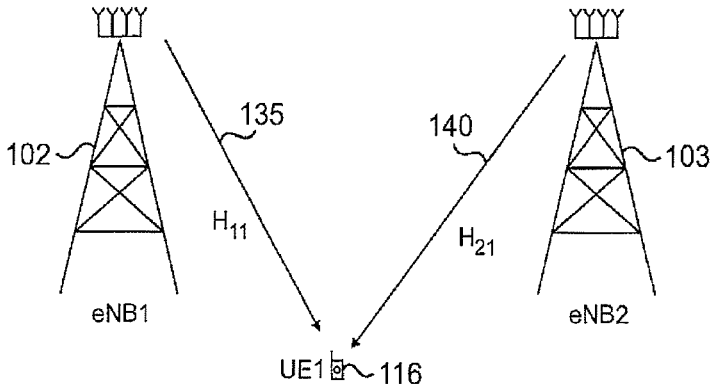
FIG. 1B illustrates a joint transmission in a wireless network according embodiments of the present disclosure.

FIG. 1B illustrates a joint transmission in a wireless network 100 according embodiments of the present disclosure. Base station (BS) 102 (e.g., "Cell 1") and BS 103 (e.g., "Cell 2") are performing a coordinated multipoint (CoMP) transmission to the subscriber station (SS) 116, that is, communications to and from SS 116 are conducted through BS 102 and BS 103. $H_{i1}$ corresponds to the wireless channel from "Cell i" to SS 116. Accordingly, $H_{11}$ 135 corresponds to the wireless channel from BS 102 to SS 116; and $H_{21}$ 140 corresponds to the wireless channel from BS 103 to SS 116. When in the joint processing mode, BS 102 and BS 103 jointly process SS 116's information together. BS 102 and BS 103 send SS 116's information over the air to SS 116 substantially simultaneously through the wireless channels. By doing this, the interference is greatly reduced while the received power (sum from the two cells BS 102 and BS 103) is greatly improved. Illustration of two cells, BS 102 and BS 103 is for example purposes only and other embodiments including more than two cells could be used without departing from the scope of this disclosure.

CoMP transmission can be classified into two categories: coordinated scheduling and/or beam-forming, and CoMP joint transmission. In coordinated scheduling and/or beam-forming, data to SS 116 is transmitted from BS 102 while the scheduling decisions are coordinated to control the interference generated in a set of coordinated cells. In other words, the data intended for SS 116 is not shared while some information related to the channels and the controls are shared among different cells. The signals received from other cells or base stations are treated as inter-cell interference and are avoided in the spatial, frequency or time domain. Alternatively, in the class of joint processing and joint transmission, data to SS 116 is substantially simultaneously transmitted from multiple transmission points to improve the received signal quality and/or cancel activity interference for other subscriber stations. Data intended for a particular SS 116 is shared among different cells, such as between BS 102 and BS 103, and is jointly processed at these cells. As a result of this joint processing, the received signals at SS 116 will be coherently or non-coherently added up together. The signals received from other cells or base stations are treated as useful signals that contribute to a much higher received SNR at SS 116. Within this mode of operation, the two classes of transmission schemes are: CoMP SU-MIMO and CoMP For CoMP SU-MIMO, the CoMP joint transmission can increase both the average cell throughput together with the cell-edge user throughput.

SS 116 can receive signals $H_{11}$ 135 from BS 102 and signals $H_{21}$ 140 from BS 103 respectively. SS 116 superimposes the signals with each other instead of treating one of the signals as interfering. For example, BS 102 includes a number, $N_{T1}$, of transmit antenna. Additionally, SS 116 includes a number, $N_R$, of receive antennas. The received signal at SS 116 can be represented by Equation 1:

$$Y_1=H_{11}w_1X_1+H_{21}w_2X_1+N_1 \quad \text{[Eqn. 1].}$$

In Equation 1, $H_{11}$ 135 and $H_{21}$ 140 represent the respective channel gains from BS 102 and BS 103 to SS 116. Additionally, $Y_1$ is the $N_R\times1$ vector of received signal at SS 116, $X_1$ is the intended message for SS 116, $w_i$ is the $N_{T1}\times v$ precoding vector of transmitted signal at BS 102, and $N_i$ is the $N_R\times1$ AWGN noise vector. Further, v is the number of transmission layers of signal $X_1$.

Figure 1C:
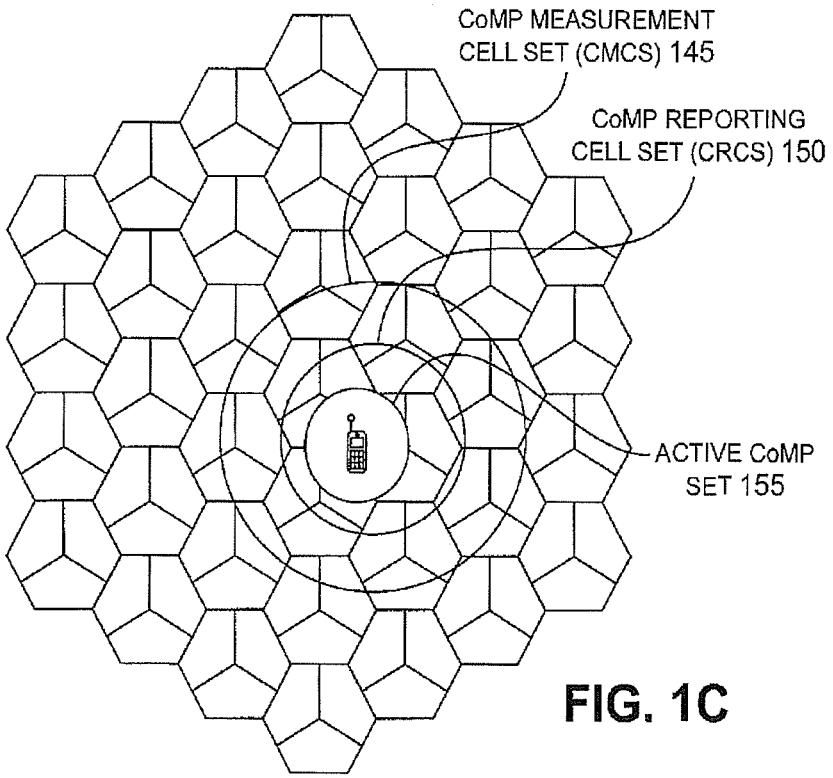
FIG. 1C illustrates CMCS, CRCS and Active CoMP Sets according to embodiments of the present disclosure.

FIG. 1C illustrates CMCS, CRCS and Active CoMP Sets according to embodiments of the present disclosure. The embodiment shown in FIG. 1C is for illustration only. Other embodiments could be used without departing from the scope of this disclosure.

In order to perform the CoMP joint processing operation, the network decides which set of cells will be transmitting to a particular CoMP UE (e.g., CoMP subscriber station) and what the related channel information is. In some embodiments, there exist several CoMP sets. The network first configures a set of cells ("CoMP measurement cell set (CMCS)") to be measured by CoMP subscriber stations. The CMCS 145 is a set of cells monitored, measured, and reported by the CoMP UE. The CMCS 145 is configured semi-statically and can be completely determined by the network or be determined by the network with the assistant from CoMP UEs. Based on the measurements on the "CMCS" 145, the network will then configure another set of cells ("CoMP reporting cell set (CRCS) 150") to be the set of cells that CoMP UEs should report the information related to channel knowledge (channel coefficients, precoding matrix indices, channel quality indices and so forth). This CRCS 150 can be configured by the network with the assistance of the CoMP UEs. In some embodiments, to enable this procedure SS 116 can feedback a received SINR or an indication of preference. After obtaining the channel related information, the network decides the "Active CoMP set" 155 (the set of cells which send CoMP PDSCH to the CoMP UE) and performs the CoMP joint processing. That is, the network determines which set of cells, referred to as the Active CoMP set 155, will transmit to the CoMP UE.

The configuration of the CRCS 150 can be semi-statistic and subscriber station-specific. The configuration of the CRCS 150 and can be important for the uplink overhead since the UL channel quality reporting of SS 116, when a CoMP subscriber station, is tied to this set. In some embodiments, the reporting within the CRCS 150 is dynamic. Since the CRCS 150 can be relatively large, such as three (3) cells or more, if SS 116 reports channel related information for all the cells within the CRCS 150 all the time, the overhead can be very large. Furthermore, since demodulation of CoMP PDSCH will be based on DRS, R1-091066, "Way forward on downlink reference signals for LTE-A", the contents of which hereby are incorporated by reference, the network can be free to decide the active CoMP set 155. Therefore, if the network decides to use fewer transmission points within the CRCS 150, the network only needs to know channel related information for a subset of the CRCS 150. The dynamic channel feedback reporting will then significantly reduce the feedback overhead.

In CoMP joint processing, a collision between CoMP PDSCH and reference signals (RS) including common reference signals (CRS) from different cells may occur. This problem can occur where cell-specific frequency/time shifts are used for the reference signals in the cells involved in the joint transmission and, at the same time, the PDSCH mapping is assumed to be the same in all the cells. In general, this issue exists for non-CoMP subscriber stations when their PDSCH collides with reference signals from other cells. However, CoMP subscriber stations can be more susceptible to this type of PDSCH-to-RS interference because the PDSCH received is assumed to be coherently combined over the air.

The demodulation of CoMP PDSCH can be based on DRS to enable transparent transmission between SS 116 and the active CoMP set. That is, SS 116, as a CoMP subscriber station, should not be aware of the active CoMP set.

Figure 2:
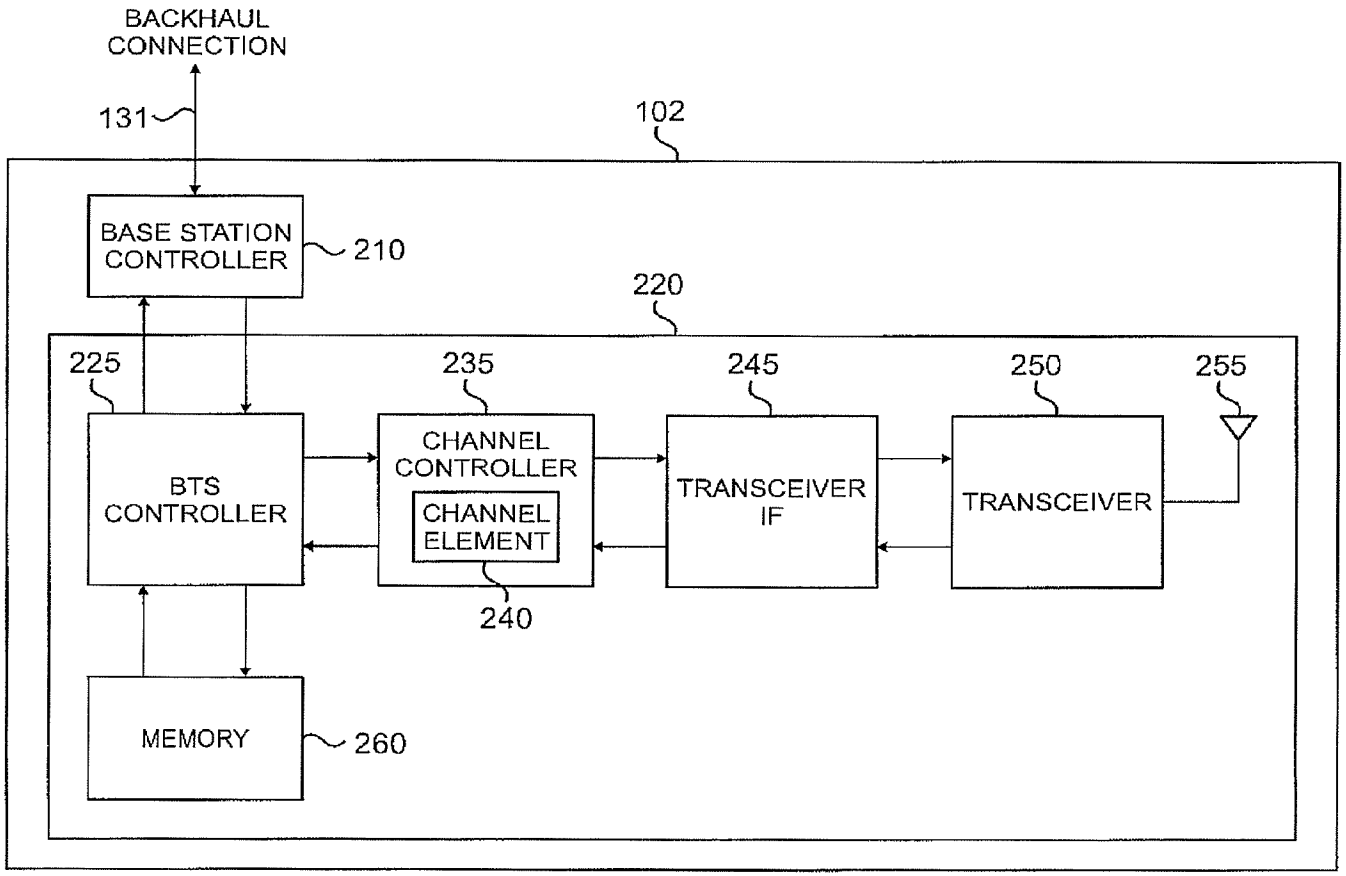
FIG. 2 illustrates exemplary base station in greater detail according to embodiments of the present disclosure.

FIG. 2 illustrates an exemplary base station in greater detail according to one embodiment of the present disclosure. The embodiment of base station 102 illustrated in FIG. 2 is for illustration only. Other embodiments of the base station 102 could be used without departing from the scope of this disclosure.

Base station 102 comprises base station controller (BSC) 210 and base transceiver subsystem (BTS) 220. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present disclosure, the base transceiver subsystems in each of cells 121, 122 and 123 and the base station controller associated with each base transceiver subsystem are collectively represented by BS 101, BS 102 and BS 103, respectively.

BSC 210 manages the resources in cell site 121, including BTS 220. BTS 220 comprises BTS controller 225, channel controller 235, transceiver interface (IF) 245, RF transceiver unit 250, and antenna array 255. Channel controller 235 comprises a plurality of channel elements, including exemplary channel element 240. BTS 220 also comprises a memory 260. The embodiment memory 260 included within BTS 220 is for illustration only. Memory 260 can be located in other portions of BS 102 without departing from the scope of this disclosure.

BTS controller 225 comprises processing circuitry and memory capable of executing an operating program that communicates with BSC 210 and controls the overall operation of BTS 220. Under normal conditions, BTS controller 225 directs the operation of channel controller 235, which contains a number of channel elements, including channel element 240, that perform bi-directional communications in the forward channels and the reverse channels. A forward channel refers to a channel in which signals are transmitted from the base station to the mobile station (also referred to as DOWNLINK communications). A reverse channel refers to a channel in which signals are transmitted from the mobile station to the base station (also referred to as UPLINK communications). In an advantageous embodiment of the present disclosure, the channel elements communicate according to an OFDMA protocol with the mobile stations in cell 120. Transceiver IF 245 transfers the bi-directional channel signals between channel controller 240 and RF transceiver unit 250. The embodiment of RF transceiver unit 250 as a single device is for illustration only. RF transceiver unit 250 can separate transmitter and receiver devices without departing from the scope of this disclosure.

Antenna array 255 transmits forward channel signals received from RF transceiver unit 250 to mobile stations in the coverage area of BS 102. Antenna array 255 also sends to transceiver 250 reverse channel signals received from mobile stations in the coverage area of BS 102. In some embodiments of the present disclosure, antenna array 255 is a multi-sector antenna, such as a three-sector antenna in which each antenna sector is responsible for transmitting and receiving in a 120° arc of coverage area. Additionally, RF transceiver 250 may contain an antenna selection unit to select among different antennas in antenna array 255 during transmit and receive operations.

According to some embodiments of the present disclosure, BTS controller 225 is operable to execute programs, such as an operating system (OS) and processes for CoMP reporting and transparent resource mapping, stored in a memory 260. Memory 260 can be any computer readable medium, for example, the memory 260 can be any electronic, magnetic, electromagnetic, optical, electro-optical, electro-mechanical, and/or other physical device that can contain, store, communicate, propagate, or transmit a computer program, software, firmware, or data for use by the microprocessor or other computer-related system or method. Memory 260 comprises a random access memory (RAM) and another part of memory 260 comprises a Flash memory, which acts as a read-only memory (ROM).

BSC 210 is operable to maintain communications between BS 102 and BS 101 and BS 103. BS 102 communicates to BS 101 and BS 103 via the wireless connection 131. In some embodiments, the wireless connection 131 is wire-line connection.

Figure 3:
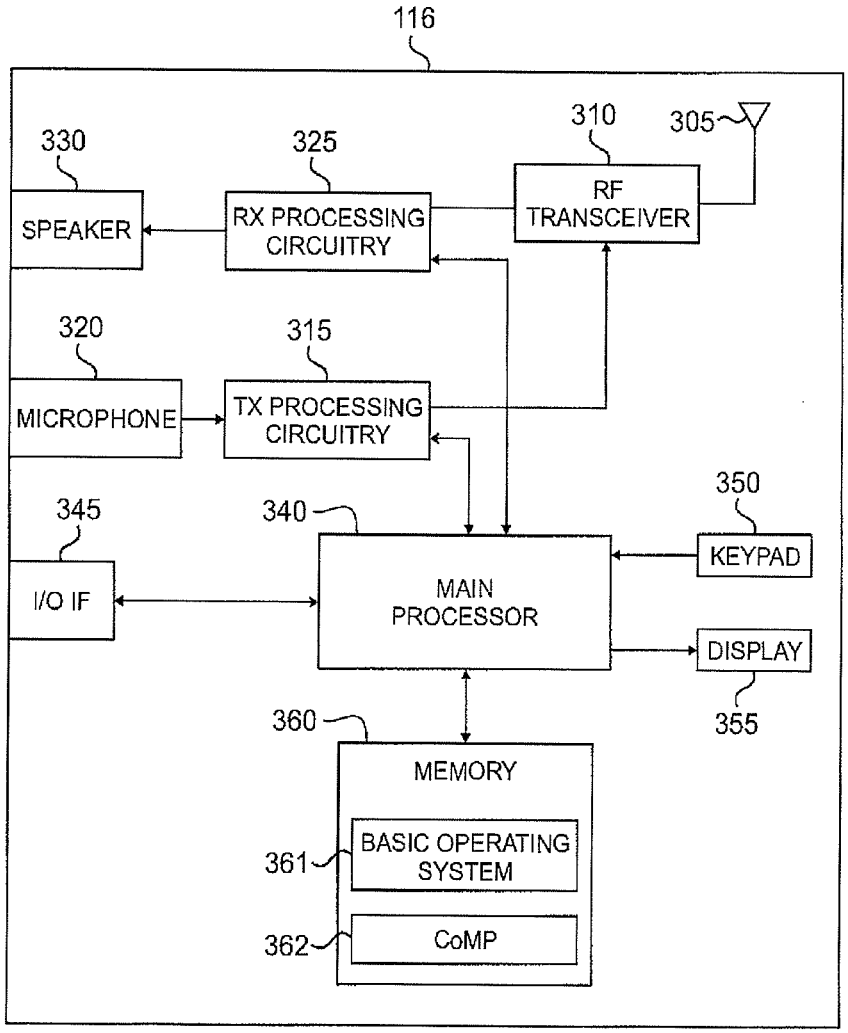
FIG. 3 illustrates an exemplary wireless mobile station according to embodiments of the present disclosure.

FIG. 3 illustrates an exemplary wireless subscriber station according to embodiments of the present disclosure. The embodiment of wireless subscriber station 116 illustrated in FIG. 3 is for illustration only. Other embodiments of the wireless subscriber station 116 could be used without departing from the scope of this disclosure.

Wireless subscriber station 116 comprises antenna 305, radio frequency (RF) transceiver 310, transmit (TX) processing circuitry 315, microphone 320, and receive (RX) processing circuitry 325. SS 116 also comprises speaker 330, main processor 340, input/output (I/O) interface (IF) 345, keypad 350, display 355, and memory 360. Memory 360 further comprises basic operating system (OS) program 361 and applications for CoMP reporting and transparent resource mapping 362.

Radio frequency (RF) transceiver 310 receives from antenna 305 an incoming RF signal transmitted by a base station of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RF) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In some embodiments of the present disclosure, main processor 340 is a microprocessor or microcontroller. Memory 360 is coupled to main processor 340. According to some embodiments of the present disclosure, part of memory 360 comprises a random access memory (RAM) and another part of memory 360 comprises a Flash memory, which acts as a read-only memory (ROM).

Main processor 340 executes basic operating system (OS) program 361 stored in memory 360 in order to control the overall operation of wireless subscriber station 116. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360. Main processor 340 can move data into or out of memory 360, as required by an executing process. In some embodiments, the main processor 340 is configured execute programs, such as OS 361 and processes for CoMP reporting and transparent resource mapping 362. The main processor 340 can execute the CoMP reporting and transparent resource mapping 362 based on OS program 361 or in response to a signal received from BS 102. Main processor 340 is also coupled to I/O interface 345. I/O interface 345 provides subscriber station 116 with the ability to connect to other devices such as laptop computers and handheld computers. I/O interface 345 is the communication path between these accessories and main controller 340.

Main processor 340 is also coupled to keypad 350 and display unit 355. The operator of subscriber station 116 uses keypad 350 to enter data into subscriber station 116. Display 355 may be a liquid crystal display capable of rendering text and/or at least limited graphics from web sites. Alternate embodiments may use other types of displays.

In some embodiments, the network first configures, via higher layer signaling, a set of cells, i.e., the CMCS 145, to be measured by CoMP UEs, i.e., SS 116. After obtaining a feedback from SS 116, the network semi-statistically configures, via higher layer signaling, a second set of cells, i.e., the CRCS 150, to be the set of cells to which SS 116 reports information related to the channel.

Figure 4:
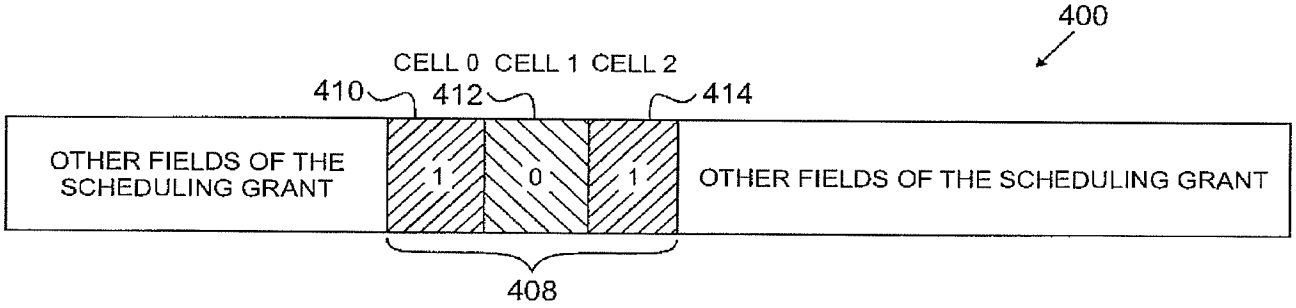
FIGS. 4 and 6 illustrate an uplink scheduling grant for CoMP transmissions according to embodiments of the present disclosure.

FIG. 4 illustrates an uplink scheduling grant for CoMP transmissions according to embodiments of the present disclosure. The embodiment of the scheduling grant 400 shown in FIG. 4 is for illustration only. Other embodiments could be used without departing from the scope of this disclosure.

In some embodiments, the network dynamically assigns channel information related reports, such as a channel quality index (CQI) report, within the CRCS 150. Additionally, the reporting set, CRCS 150, may not be used since the measurement set, CMCS 145, can be used to serve as the reporting set (that is, the measurement set and the reporting set can be merged into the measurement set). The uplink scheduling grant 400 includes a bitmap 408 included in a new downlink control information (DCI) format. The bits 410, 412, 414 indicate the cells to be reported by SS 116 on the channel related information through the CQI report. The cell IDs of these cells are available at SS 116. For example, the first bit 410 corresponds to BS 102, the second bit 412 corresponds to BS 103 and the third bit 414 corresponds to BS 101. The default ordering of the cells within the CRCS 150 can be in increasing order of the cell IDs or in decreasing order of the cell IDs. For each bit 410, 412, 414, "0" can indicate that the corresponding cell, such as BS 102, is needed for channel information related feedback report, such as the CQI report and vice versa.

For example, using the uplink scheduling grant 400 with the new DCI format shown in FIG. 4, it is indicated to SS 116 that SS 116 needs to feedback channel related information concerning BS 102 (Cell 0) and BS 101 (Cell 2) during the CQI report process. The ordering of the cells in the bitmap 408 can be in the increasing order of the cell IDs, decreasing order or any other predetermined order. In the bitmap 408 all the cells or base stations within the CRCS 150 will be indicated by the bitmap 408. The overall process can be illustrated with respect to FIG. 5.

Figure 5:
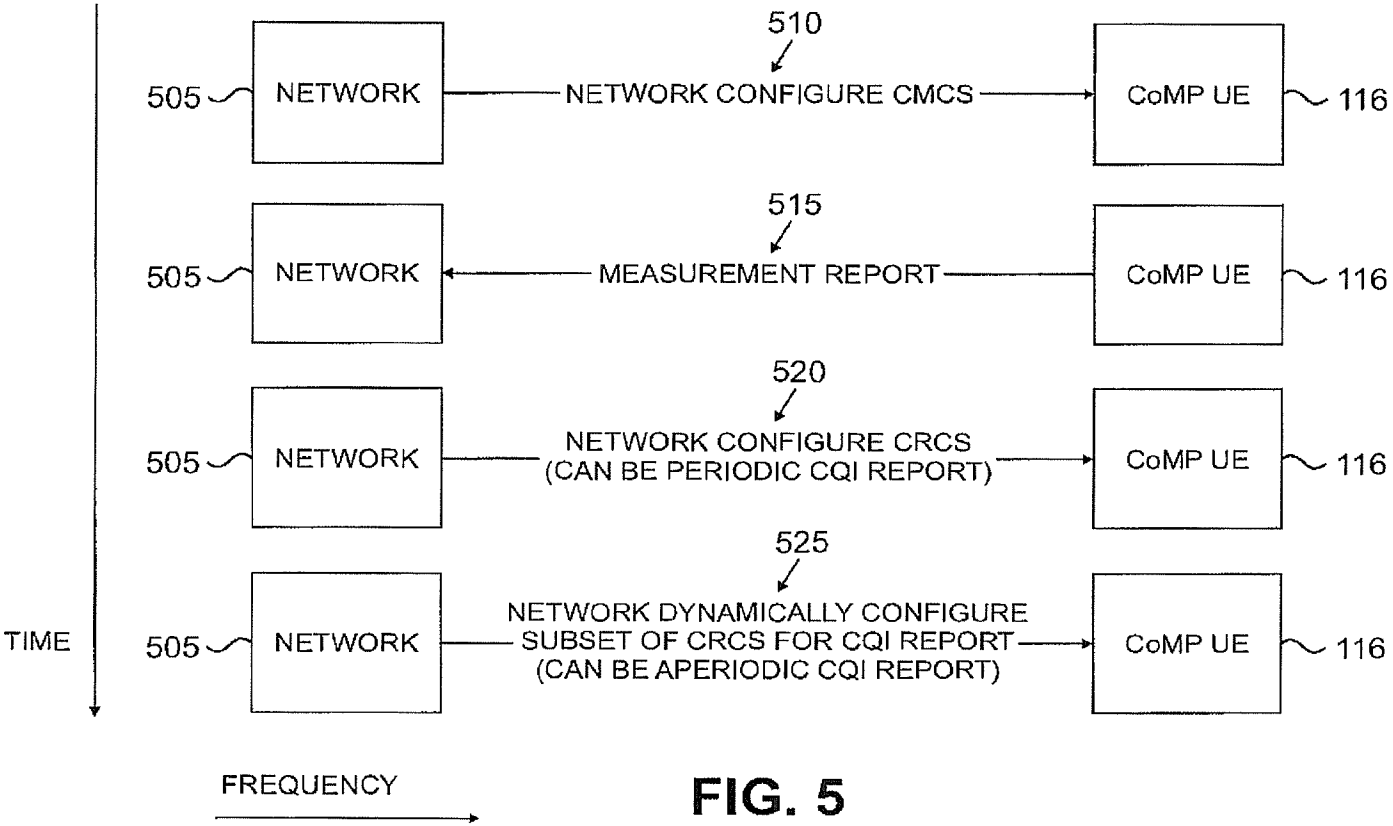
FIG. 5 illustrates a process for network configuration of CoMP sets according to embodiments of the present disclosure.

FIG. 5 illustrates a process for network configuration of CoMP sets according to embodiments of the present disclosure. The embodiment shown in FIG. 5 is for illustration only. Other embodiments could be used without departing from the scope of this disclosure.

The network 505 configures 510 the CMCS 145 for SS 116 via higher layer signaling. The network 505 can configure 510 the CMCS 145 to SS 116 through a radio resource control (RRC) configuration. Then, SS 116 knows which cells are included in the CMCS 145. Thereafter, SS 116 transmits a measurement report 515 regarding each of the cells included in the CMCS 145. The network 505 configures 520 the CRCS 150. The CRCS 150 can be configured as a periodic CQI. The network 505 then configures 525 a subset of the CRCS 150 to be the set of cells regarding which SS 116 should report the information related to channel knowledge. The subset of the CRCS 150 can be an aperiodic CQI report. Accordingly, SS 116 can down-select, from the CMCS 145 and CRCS 150, the cells under review. For example, SS 116 can perform aperiodic CQI reporting of the subset of the cells included in the CRCS 150.

Figure 6:
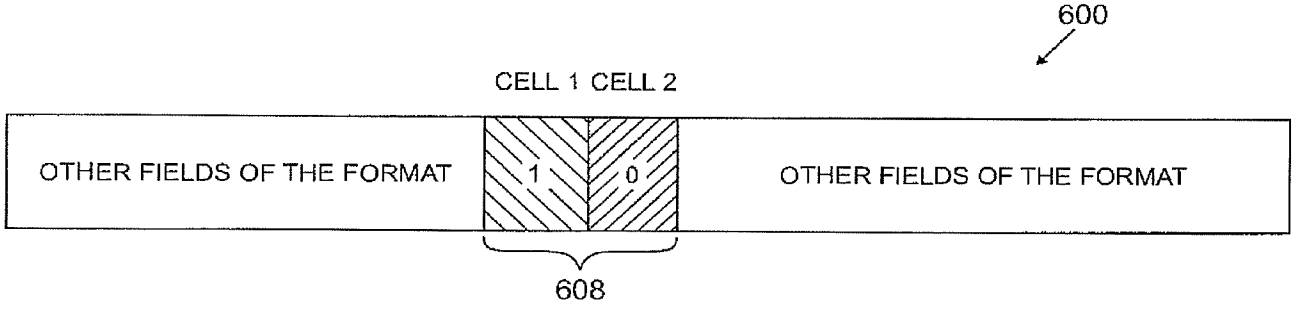

FIG. 6 illustrates another uplink scheduling grant for CoMP transmissions according to embodiments of the present disclosure. The embodiment of the scheduling grant 600 shown in FIG. 6 is for illustration only. Other embodiments could be used without departing from the scope of this disclosure.

In some embodiments, the bitmap 608 only indicates the cells or base stations, other than the anchor cell, within the CRCS. In this setup, SS 116 always reports channel related information concerning BS 102 (the anchor cell) during the CQI report process. For example, when BS 102 (Cell 0) is the anchor cell, only two (2) bits of the bitmap 608 are needed to indicate the other cells, BS 101 and BS 103, within the CoMP set. The mapping can be in increasing order of the cell ID, in decreasing order of the cell ID or another predetermined order as configured by higher layer. For example, SS 116 can include a bitmap table, such as Table 1 below, stored in memory 360. SS 116 can interpret the bitmap 608 according to Table 1.

TABLE 1

| Bitmap of Cell Selection for CQI reporting | |
|---|---|
| Bit in the field | Reporting Cells of the CQI Report Process |
| [0 0] | Cell 0 |
| [0 1] | Cell 0 and Cell 2 |
| [1 0] | Cell 0 and Cell 1 |
| [1 1] | Cell 0, Cell 1, and Cell 2 |

For example, when the bitmap is "1 0", SS 116 reports channel related information for BS 102 (the anchor cell, cell 0) and BS 103 (cell 1).

In some embodiments, the PDSCH is transmitted only in the resource elements that will not overlap with any of the possible reference signals, such as one or more CRSs. In this way, the PDSCH transmission of CoMP joint processing can be transparent in the sense that the SS 116 does not need to know the actual "active CoMP set". SS 116 may not expect to receive a CoMP PDSCH from the resource elements that have the possibility of colliding with CRS from other cells.

Figure 7:
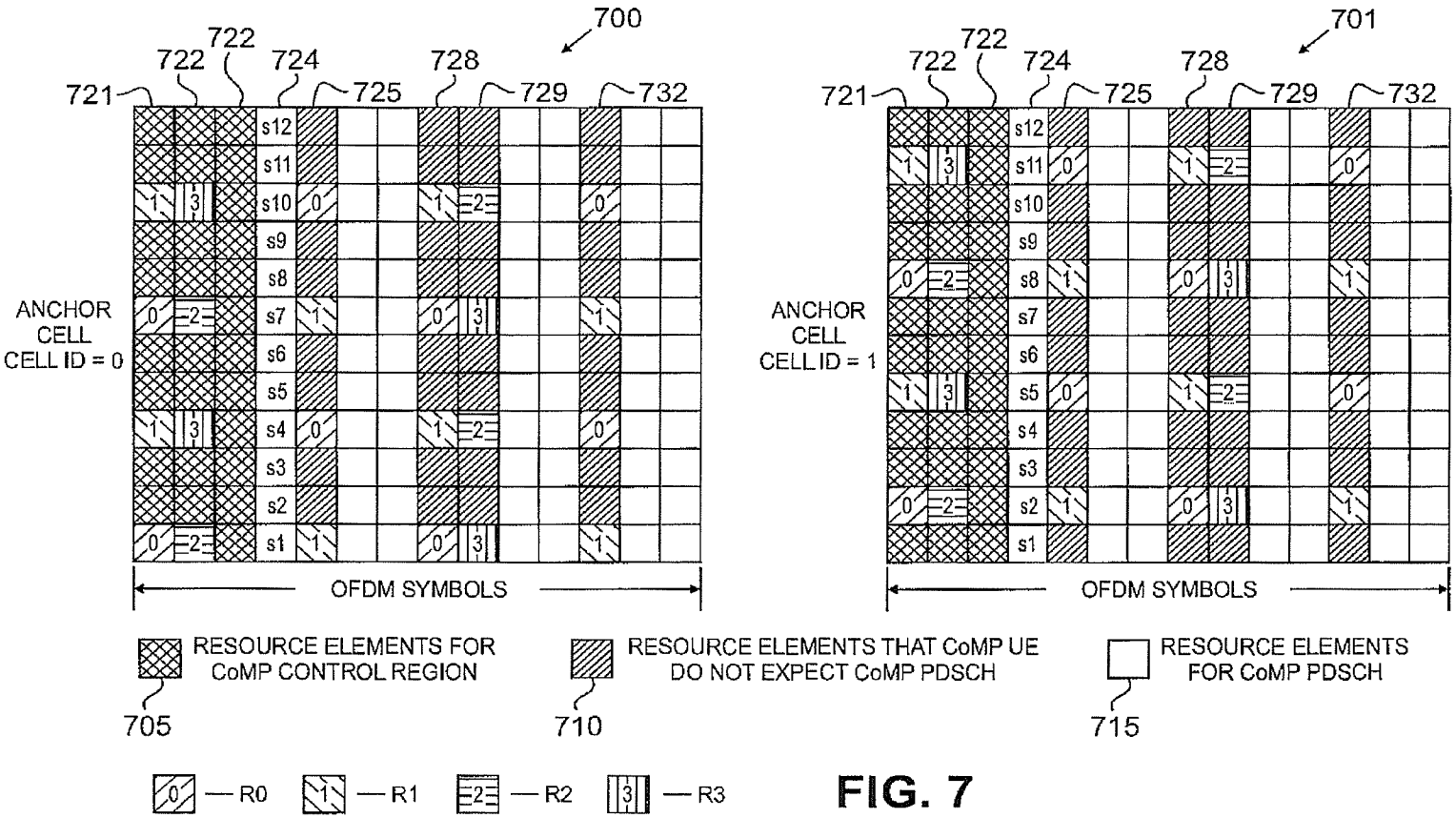
FIGS. 7 through 11 illustrate CoMP PDSCH resource mapping according to embodiments of the present disclosure.

FIG. 7 illustrates CoMP PDSCH resource mapping according to embodiments of the present disclosure. The embodiment of the CoMP PDSCH resource maps 700, 701 shown in FIG. 7 is for illustration only. Other embodiments could be used without departing from the scope of this disclosure.

For example, for the case where four CRSs are configured for each cell within the active CoMP set 155, the control region 705 for the CoMP joint processing is sent in the first three OFDM symbols 721, 722, 723 while the CoMP PDSCH region starts from the fourth OFDM symbol 724 in one subframe. The CoMP PDSCH Mapping includes a CoMP PDSCH Map 700 for BS 102 (the anchor cell, i.e., cell 0) and a CoMP PDSCH Map 701 for BS 103 (cell 1). In each CoMP PDSCH resource map 700, 701, R denotes a downlink reference signal such that $R_0$, $R_1$, $R_2$ and $R_3$ are the common reference symbols. It will be understood that R is not limited to a common reference signal and that R can refer to any reference signal without departing from the scope of this disclosure. The shaded resource elements (REs) 710 are the REs where a CRS-PDSCH collision can occur. Therefore, the shaded REs 710 are punctured and, thus, not used for transmitting CoMP PDSCH (data) 715. As such, SS 116 is not expecting to receive data from the second 722, fifth 725, eighth 728, ninth 729 and twelfth 732 OFDM symbols in a normal CP subframe. When an RE is punctured, such as by the BS, no data or reference symbol is transmitted in that RE. Puncturing the shaded REs 710 enables a reference symbol, such as the CRS, to be received stronger than if data 715 is transmitted in the shaded REs 710.

Figure 8:
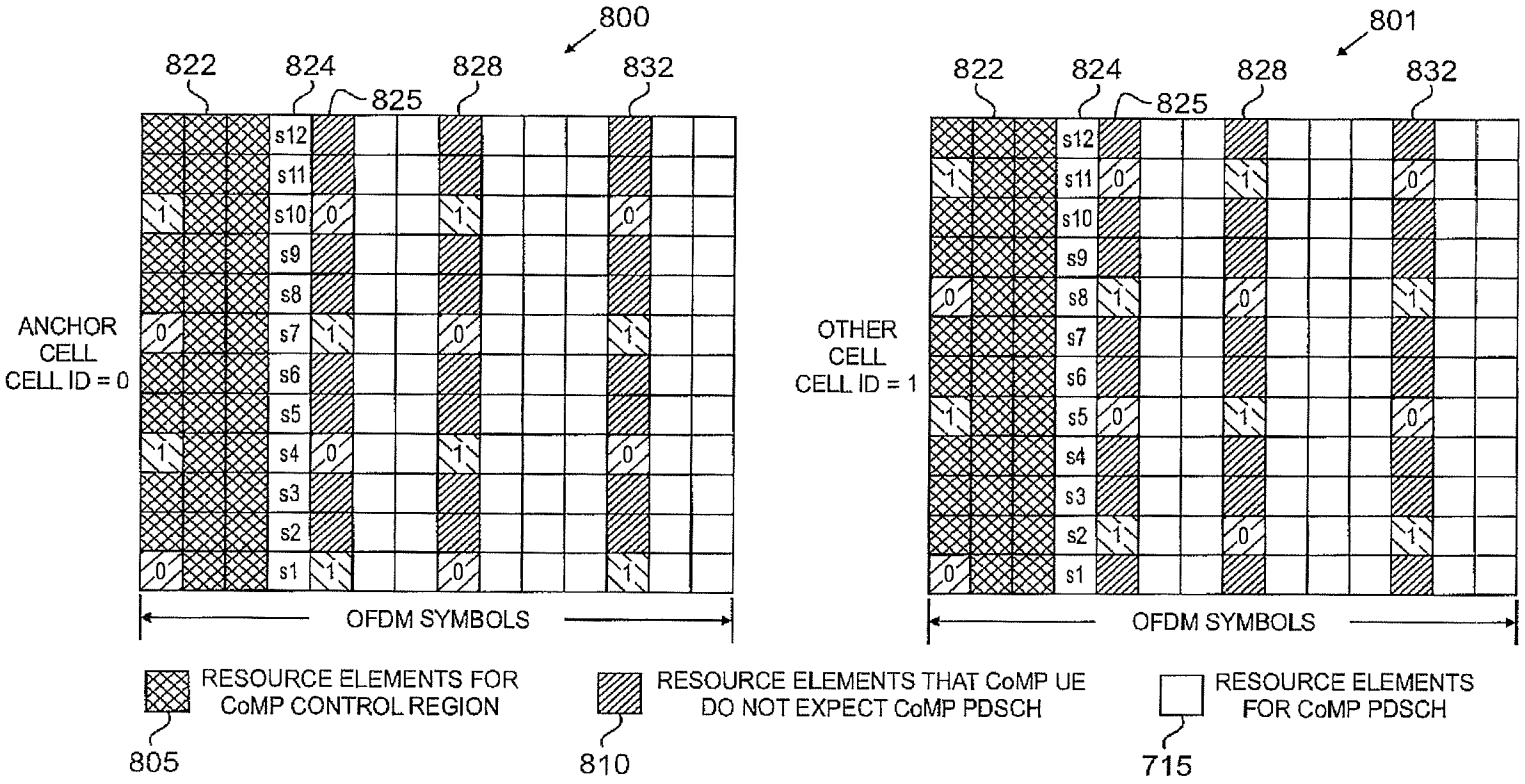

In another example, illustrated in FIG. 8, two CRSs, $R_0$ and $R_1$, are configured for each cell within the active CoMP set 155. In the CoMP PDSCH resource map 800 for BS 102 (the anchor cell, cell 0) and the CoMP PDSCH resource amp 801 for BS 103 (cell 1), the CoMP PDSCH region starts from the fourth OFDM symbols 824 in one subframe. The shaded resource elements (REs) 810 are the REs where a CRS-PDSCH collision can occur. Accordingly, the shaded REs 810 are punctured such that SS 116 is not expecting to receive data 815 from the fifth 825, eighth 828 and twelfth 832 OFDM symbols.

In some embodiments, the CoMP PDSCH resource mapping is performed according to the cell-specific shifts of the cell IDs of the CRCS. As shown in FIG. 1C, SS 116 (i.e., the CoMP UE) will be required to report channel related information to the cells in the CRCS 150 during the CQI report process; therefore, the Cell IDs of the cells within CRCS 150 will be available at the CoMP UEs, such as SS 116. Under this situation, SS 116 does not expect to receive data from resource elements that will overlap with any of the possible CRSs within the CRCS 150.

In 3GPP TS36.211. v8.5.0. "EUTRA: Physical Channels and Modulation", the contents of which are incorporated by reference, the cell-specific frequency shift is given by $$v_{shift} = N_{ID}^{cell} \bmod 6.$$

Assume the cell IDs of the cells in the CRCS are $$N_{ID1}^{cell}, N_{ID2}^{cell}$$

and $$N_{ID3}^{cell},$$

the set of possible cell-specific frequency shift can be illustrated by Equation 2:

$$v_{shift} = \{v_i, i = 1, 2, 3 | v_i = N_{IDi}^{cell} \bmod 6\}. \quad \text{[Eqn. 2]}$$

Then, SS 116 does not expect to receive CoMP PDSCH from the positions of the CRS resource elements of the described frequency shifts.

Figure 9:
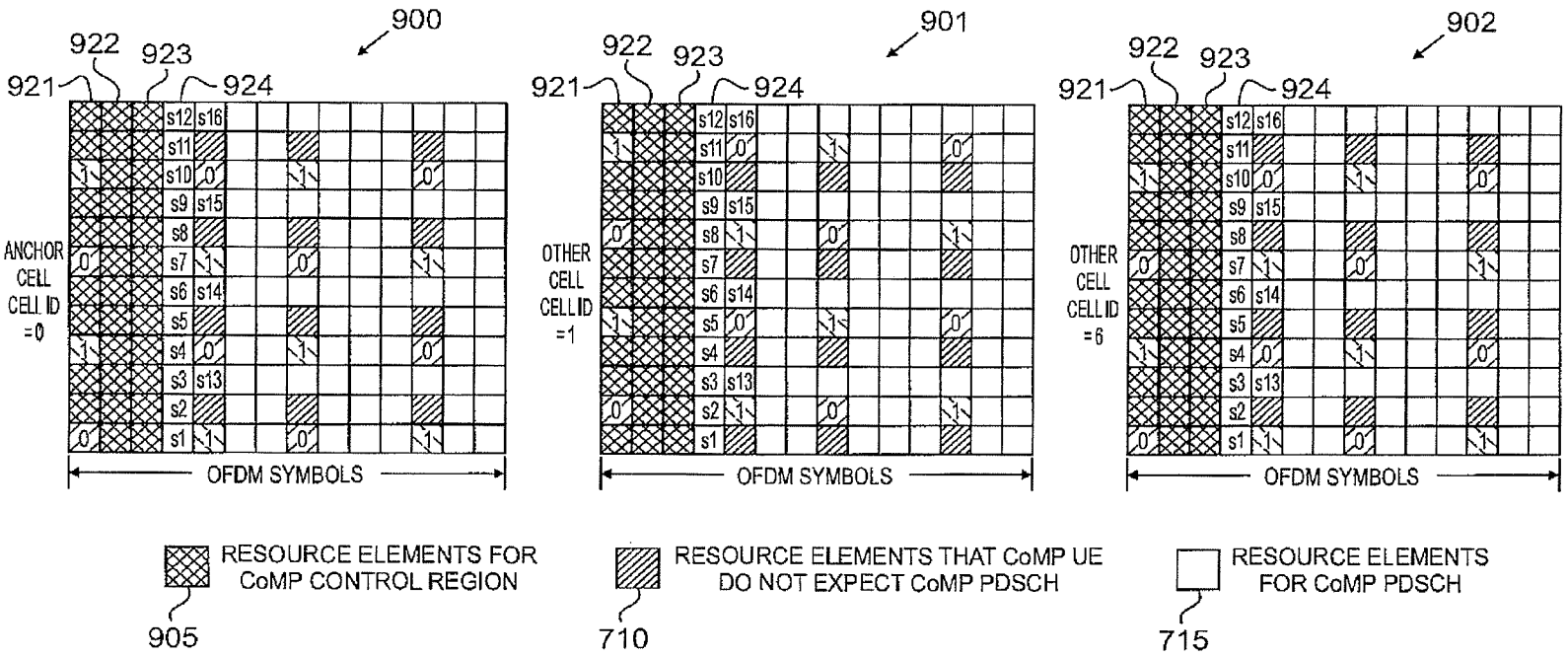

FIG. 9 illustrates CoMP PDSCH Resource Mapping Based on CRCS1 according to embodiments of the present disclosure. For example, if the CRCS1 includes three cells, in which the cells IDs are '0' for BS 102, '2' for BS 101 and '6' for another BS. Then the CoMP PDSCH resource mapping can be as shown in FIG. 9 for the case of two CRSs, $R_0$ and $R_1$, configuration. The CoMP PDSCH Mapping includes a CoMP PDSCH Map 900 for BS 102 (the anchor cell, i.e., cell 0), a CoMP PDSCH Map 901 for BS 103 (cell 1), and a CoMP PDSCH Map 902 for the cell 6 BS. In each of the CoMP PDSCH Maps 900, 901, 902, the control region 905 for the CoMP joint processing is sent in the first three OFDM symbols 921, 922, and 923 while the CoMP PDSCH region starts from the fourth OFDM symbol 924. The shaded resource elements (REs) 910 are the REs in which a CRS-PDSCH collision can occur. Therefore the shaded REs 910 are punctured and are the REs in which SS 116 does not expect to receive data 915.

Figure 10:
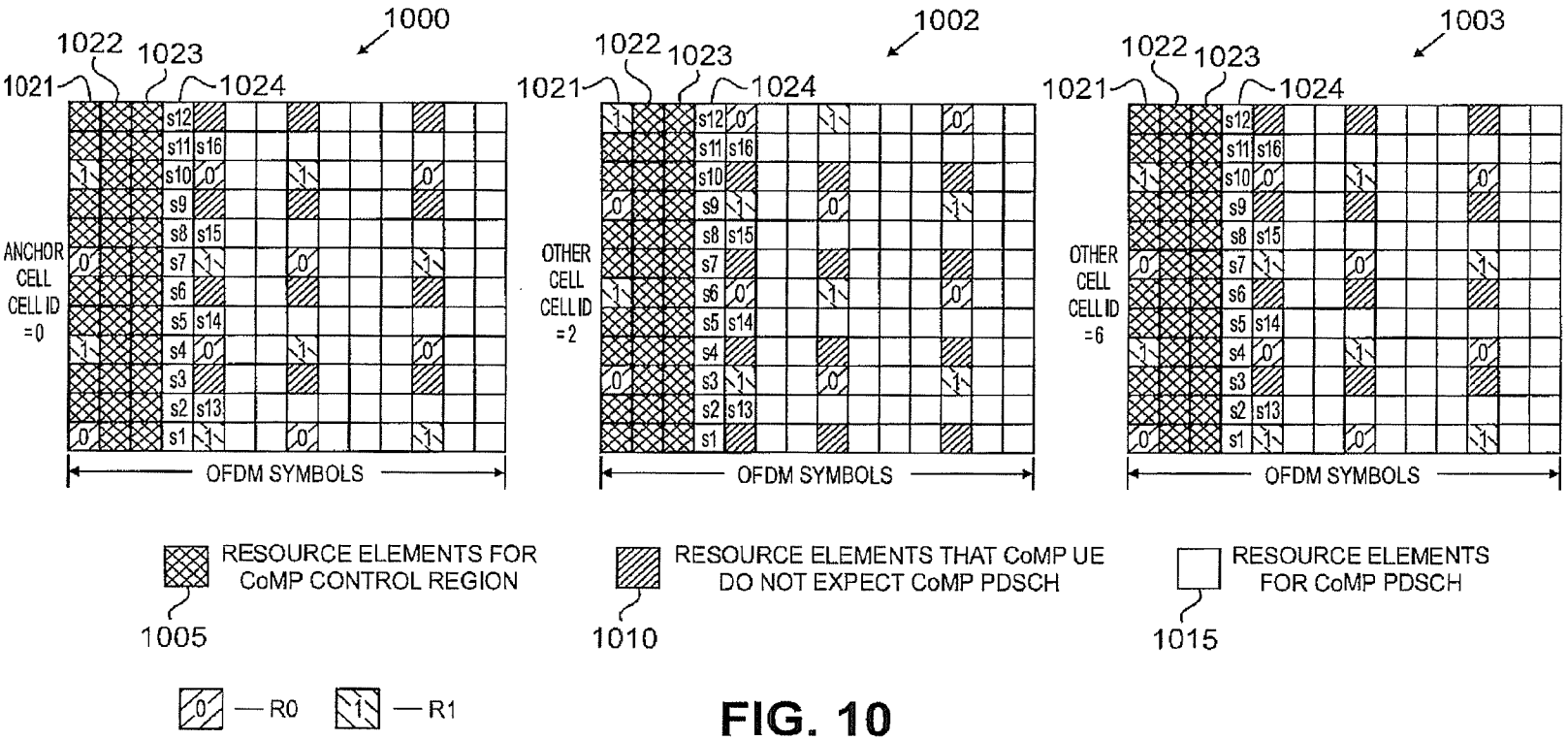

FIG. 10 illustrates another example of CoMP PDSCH resource mapping according to this disclosure. In FIG. 10, a CRCS2 is utilized for the case of two CRSs, $R_0$ and $R_1$, configuration. The CRCS2 includes three cells in which the cells IDs are '0' for BS 102, '2' for BS 101 and '6' for another BS. The CoMP PDSCH Mapping includes a CoMP PDSCH Map 1000 for BS 102 (the anchor cell, i.e., cell 0), a CoMP PDSCH Map 1002 for BS 101 (cell 2), and a CoMP PDSCH Map 1003 for the cell 6 BS. In each of the CoMP PDSCH Maps 1000, 1002, 1003, the control region 1005 for the CoMP joint processing is sent in the first three OFDM symbols 1021, 1022, and 1023 while the CoMP PDSCH region starts from the fourth OFDM symbol 1024. The shaded resource elements (REs) 1010 are the REs in which a CRS-PDSCH collision can occur. Therefore the shaded REs 1010 that are punctured and are the REs in which SS 116 does not expect to receive data 1015.

Figure 11:
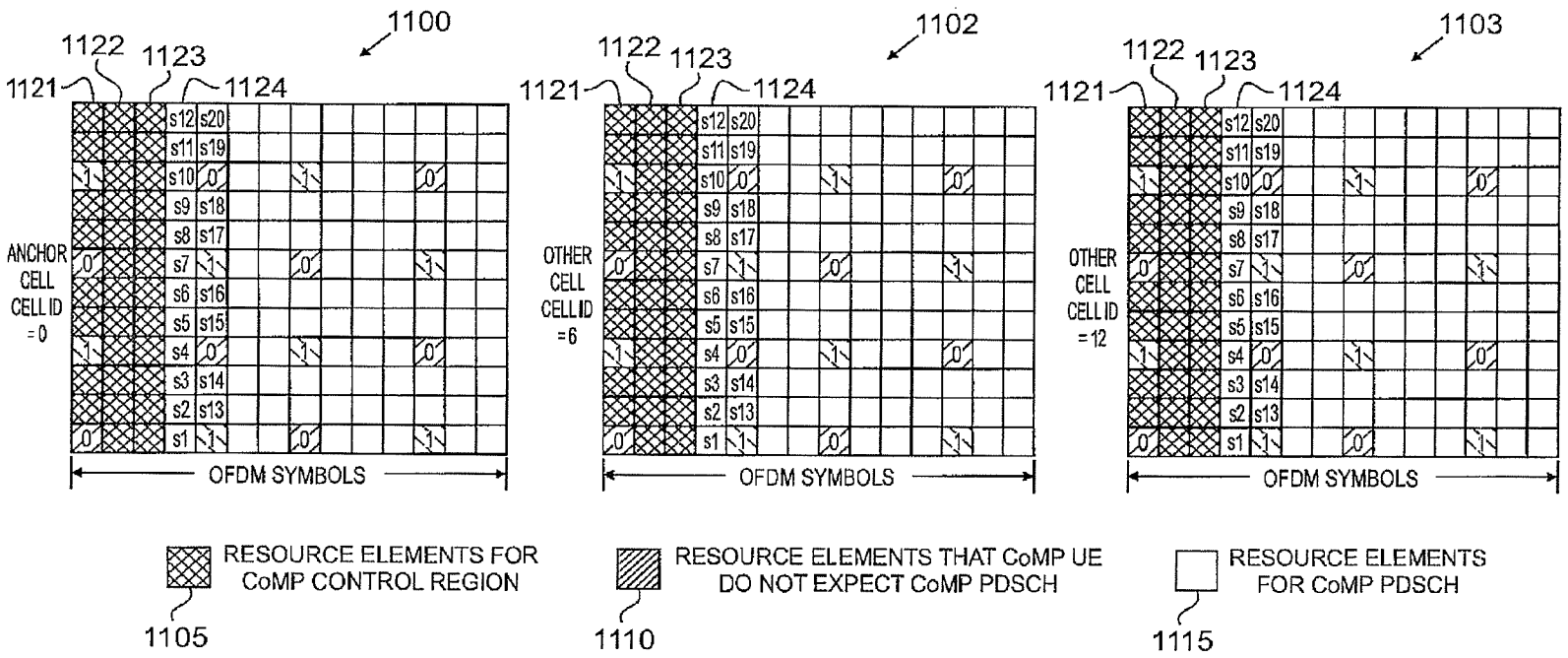

FIG. 11 illustrates another example of CoMP PDSCH resource mapping according to this disclosure. In FIG. 11, a CRCS3 is utilized for the case of two CRSs, $R_0$ and $R_1$, configuration. The CRCS3 includes three cells in which the cells IDs are '0' for BS 102, '6' for another BS and '12' for yet another BS. The CoMP PDSCH Mapping includes a CoMP PDSCH Map 1100 for BS 102 (the anchor cell, i.e., cell 0), a CoMP PDSCH Map 1103 for cell 6 BS, and a CoMP PDSCH Map 1104 for the cell 12 BS. In each of the CoMP PDSCH Maps 1100, 1102, 1103, the control region 1105 for the CoMP joint processing is sent in the first three OFDM symbols 1121, 1122, and 1123 while the CoMP PDSCH region starts from the fourth OFDM symbol 1124. In CRCS3, no REs exist in which a CRS-PDSCH collision can occur since the CRSs, $R_0$ and $R_1$, are transmitted in the same REs (also referred to as CSREs).

The resource elements mapping for CoMP PDSCH illustrated in FIGS. 7 through 11 are transparent schemes where SS 116 does not need to receive additional information regarding the CoMP PDSCH resource mapping in the downlink grant. However, in some embodiments an indication is included in the downlink grant (such as in possible new DCI formats) to indicate the possible CRS-PDSCH overlapping pattern of the active CoMP set; and SS 116 can expect to avoid performing demodulation on those overlapped resource elements.

Figure 12:
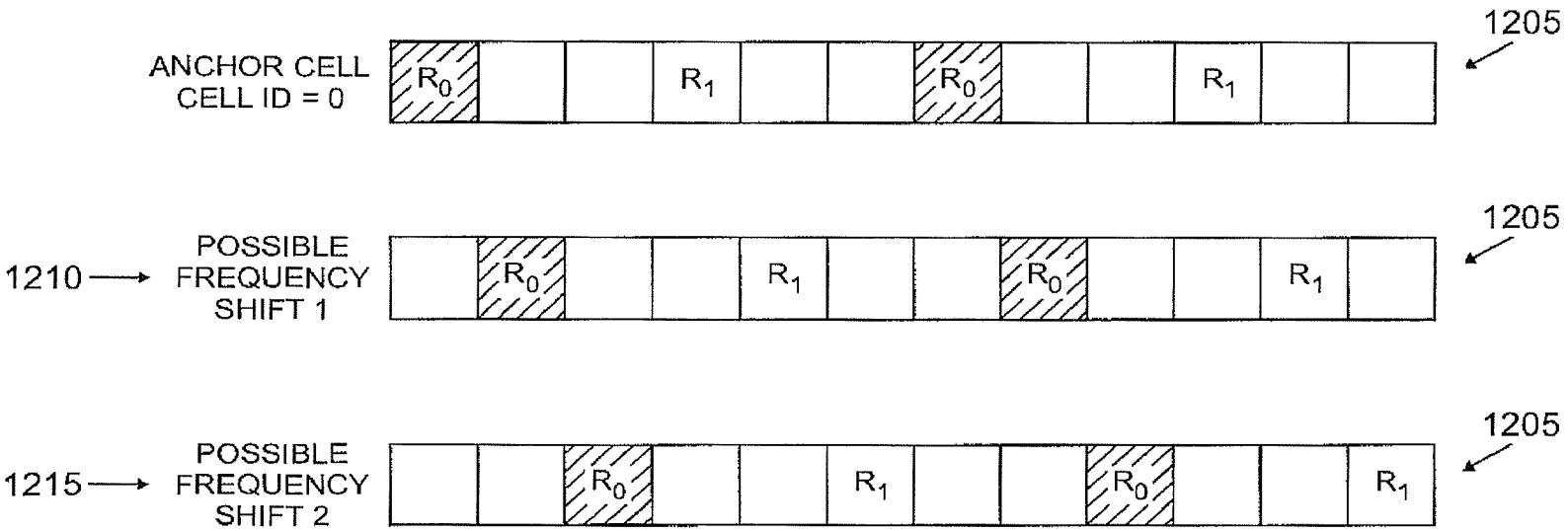
FIGS. 12 and 14 illustrate frequency shifts for CRS according to embodiments of the present disclosure.
Figure 13:
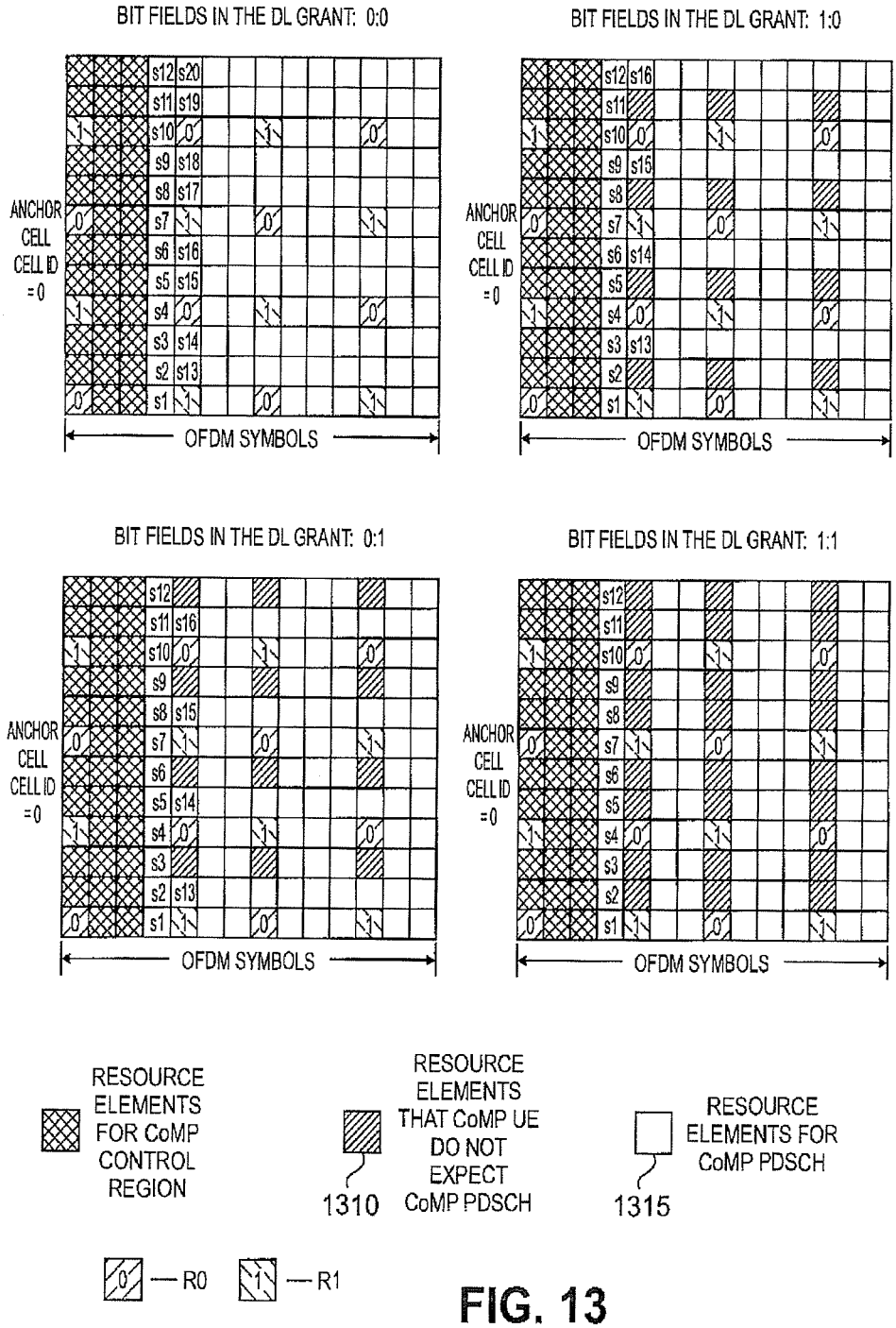
FIGS. 13 and 15 illustrate a resource element mapping of CoMP PDSCH based on overlapping patterns according to embodiments of the present disclosure.

FIG. 12 illustrates frequency shifts for CRS according to embodiments of the present disclosure. The embodiment of the frequency shifts shown in FIG. 12 is for illustration only. Other embodiments could be used without departing from the scope of this disclosure.

The CoMP UE, such as SS 116, can receive an explicit indication regarding which RE's to avoid. The indicator, included in the downlink grant, can indicate the possible CRS-PDSCH overlapping patterns and, as such, expressly indicate which REs to avoid.

For example, for the two CRS and four CRS configurations, for each OFDM symbol containing a CRS, only two other cell-specific frequency shifts can exist in that symbol. BS 102 (e.g., the anchor cell) transmits the CRS, $R_0$ and $R_1$, in a symbol 1205 as shown. The CRS, $R_0$ and $R_1$, are transmitted by BS 103 in the symbol 1205 using the next corresponding frequency, shift_1 1210. That is, BS 103 shifts the frequency for the CRS by one frequency unit in the resource map from the anchor cell, BS 102. The CRS, $R_0$ and $R_1$, are transmitted by BS 101 in the symbol 1205 using the next corresponding frequency, shift_2 1215. That is, BS 103 shifts the frequency for the CRS by two from the anchor cell, BS 102.

Therefore, from the active CoMP set 155, four possible CRS-PDSCH overlapping patterns exist: none of the other frequency shifts, possible frequency shift_1 1210, possible frequency shift_2 1215, and both of the other possible frequency shifts. Two bits can be used to indicate the overlapping pattern in the downlink grant. SS 116 can store a possible bitmap that can be summarized according to Table 2.

TABLE 2

| Bitmap of CRS Possible Positions for 2 CRS and 4 CRS Configuration | |
|---|---|
| Bit in the field | CRS Position |
| [0 0] | Only anchor cell |
| [0 1] | Anchor Cell, and Possible frequency shift 2 |
| [1 0] | Anchor Cell and Possible frequency shift 1 |
| [1 1] | Anchor Cell, Possible frequency shift 1 and Possible frequency shift 2 |

In Table 2, the possible frequency shift_1 1210 can be defined as the smallest frequency shift value other than anchor cell frequency shift and possible frequency shift_2 1215 can be defined as the other frequency shift value and vice versa. After receiving the downlink grant, SS 116 can expect to receive CoMP PDSCH, that is, data 1315, from the PDSCH resource elements region, except for the REs 1310 indicated from the bitmap. For example, assume the cell ID of the anchor cell, BS 102 is '0,' the expected RE mapping of CoMP PDSCH can be illustrated in FIG. 13 for the case where the CoMP PDSCH region starts from the fourth OFDM symbol 1305.

Figure 14:
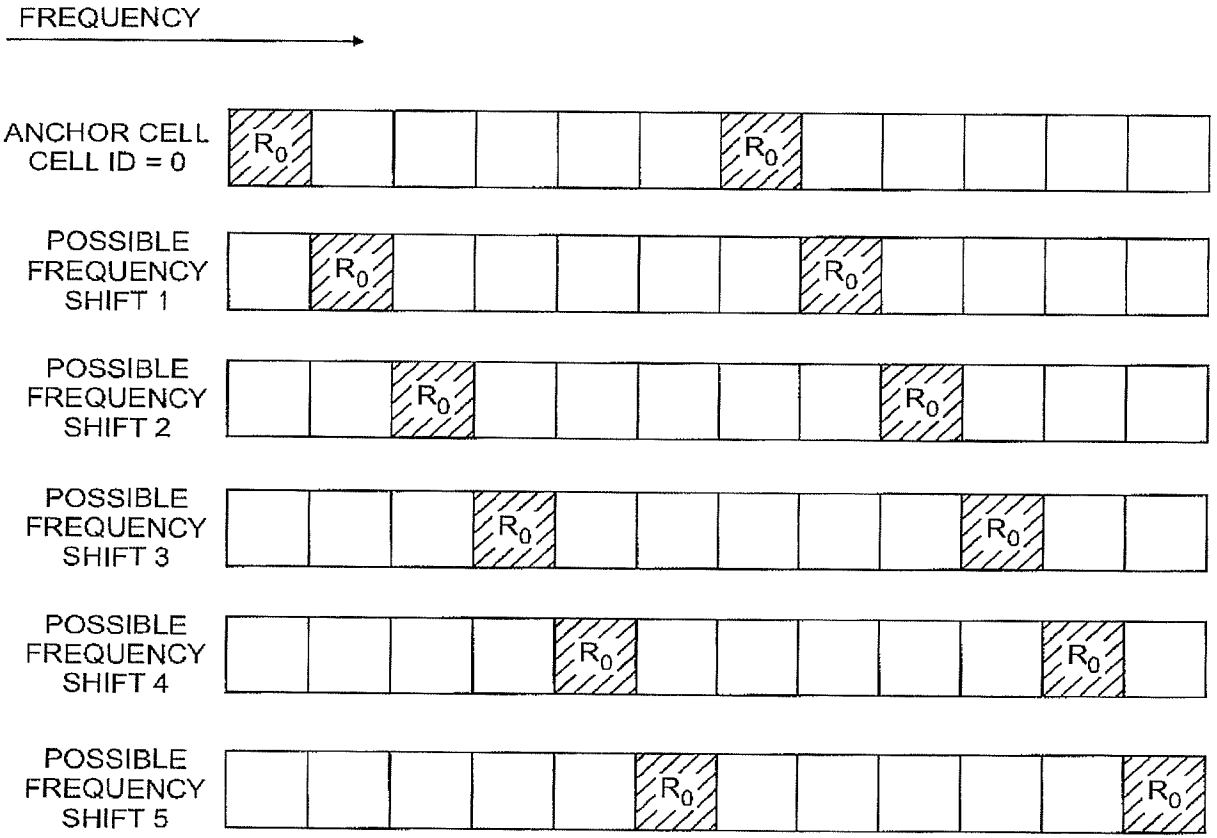

For the case where only one CRS is configured at each cell, five other possible frequency shifts exist. Therefore five bits are used to indicate the possible CRS-PDSCH overlapping patterns as illustrated in FIG. 14.

The bitmap can be formed the same way as the two CRS and four CRS cases, while the ordering of the other possible frequency shifts can be in the increasing order or decreasing order of mod 6, other than the anchor cell. In this case, the $i^{th}$ bit in the bit field indicates whether the possible frequency shift 'i' is on or not ('1' stands for on and '0' stands for off, and vice versa). For example, a '1' in the $i^{th}$ bit in the bitmap indicates that the SS 116 will not expect to receive CoMP PDSCH (e.g., data) from resource element (k, L) as shown in Equation 3:

$$k=6m+(v+v_{shift}+i)\bmod 6 \qquad \text{[Eqn. 3]}$$

$$L = 0, N_{symb}^{DL} - 3$$

$$m = 0, 1, \ldots, 2 \cdot N_{RB}^{DL} - 1.$$

The variables v and $v_{shift}$ define the position in the frequency domain for the different reference signals where v is given by Equation 4:

$$v = \begin{cases} 0 & \text{if } L = 0 \\ 1 & \text{if } L \neq 0 \end{cases}. \qquad \text{[Eqn. 4]}$$

The cell-specific frequency shift is given by $$v_{shift} = N_{ID}^{cell} \bmod 6$$

where $$N_{ID}^{cell}$$

is the anchor cell ID.

Figure 15:
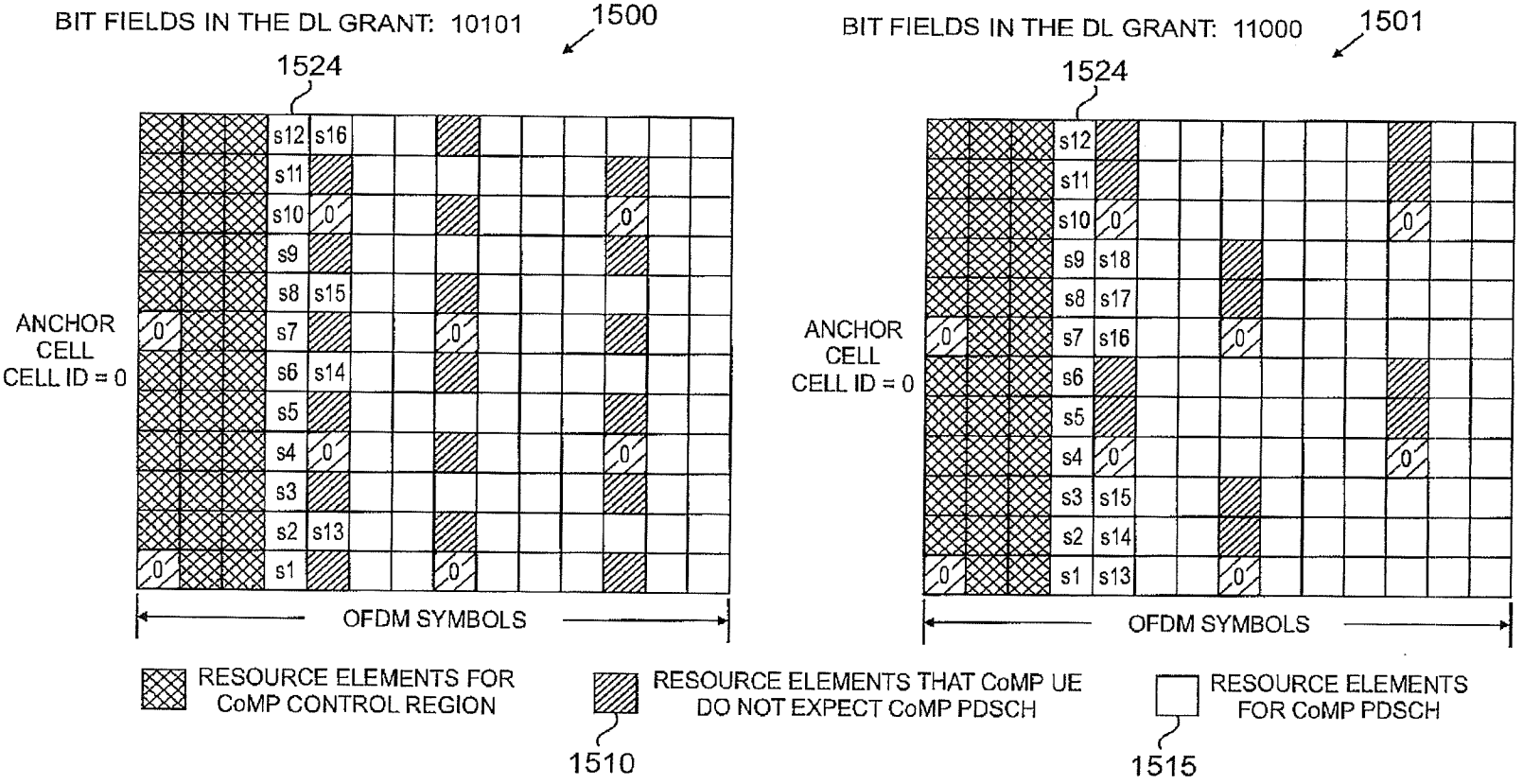

FIG. 15 illustrates a resource element mapping of CoMP PDSCH based on overlapping patterns according to embodiments of the present disclosure. The embodiment shown in FIG. 15 is for illustration only. Other embodiments could be used without departing from the scope of this disclosure.

For example, when the cell ID of BS 102, e.g., the anchor cell, is '0,' the expected RE mapping of CoMP PDSCH can be as illustrated in FIG. 15. In the CoMP PDSCH resource map 1500 for BS 102 (the anchor cell, cell 0) and the CoMP PDSCH resource amp 1501 for BS 103 (cell 1), the CoMP PDSCH region starts from the fourth OFDM symbols 1524 in one subframe. Further, the bitmap in the DL grant for CoMP PDSCH resource map 1500 is "1 0 1 0 1" and the bitmap for CoMP PDSCH resource map 1501 is "1 1 0 0 0." The shaded resource elements (REs) 1510 are the REs where a CRS-PDSCH collision can occur. Accordingly, the shaded REs 1510 are punctured such that SS 116 is not expecting to receive data 1515 in the shaded REs 1510.

In some embodiments, the CRS-PDSCH overlapping pattern is configured semi-statistically. The bitmap of the overlapping pattern can be sent to SS 116 through higher layer signaling semi-statistically. Once SS 116 receives the indication, SS 116 will assume certain type of CoMP PDSCH resource mapping for the downlink transmission.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communication network, a base station capable of communicating with a plurality of subscriber stations, the base station comprising:

a plurality of antennas configured to transmit data and control information;

a transmitter coupled to the plurality of antenna, *wherein* the transmitter is configured to transmit a plurality of symbols in a sub-frame to a subscriber station; and a controller configured to include a bitmap in a downlink control information (DCI), wherein the bitmap is configured to inform the subscriber station regarding a subset of cells [within], *from among* a coordinated multipoint (CoMP) measurement set *of cells, to be measured* for channel quality information reporting.

2. The base station as set forth in claim 1, wherein the bitmap comprises a plurality of bits that correspond to respective cells of the CoMP measurement set.

3. The base station as set forth in claim 2, wherein the subset of cells within the CoMP measurement set includes an anchor cell serving the subscriber station and wherein the plurality of bits comprises at least two bits configured to identify cells within the subset of cells within the CoMP measurement set other than the anchor cell.

4. For use in a wireless communication network, a subscriber station capable of communicating with a plurality of base stations, the subscriber station comprising:

a plurality of antennas configured to receive data and control information;

a receiver coupled to the plurality of antenna, *wherein* the receiver is configured to receive a plurality of symbols from a Physical Downlink Control Channel (PDCCH) in a subframe from a base station; and a controller configured to interpret a bitmap in a downlink control information (DCI), wherein the bitmap is configured to identify a subset of cells [within], *from*

*among* a *coordinated multipoint* (CoMP) measurement set *of cells, to be measured* for channel quality information reporting.

5. The subscriber station as set forth in claim 4, wherein the bitmap comprises a plurality of bits that correspond to respective cells of the CoMP measurement set.

6. The subscriber station as set forth in claim 5, wherein the subset of cells within the CoMP measurement set includes an anchor cell serving the subscriber station and wherein the plurality of bits comprises at least two bits configured to identify cells within the subset of cells within the CoMP measurement set other than the anchor cell.

7. For use in a wireless communication network, a method for communicating with a plurality of subscriber stations, the method comprising:

transmitting, to a subscriber station, a plurality of symbols in a sub-frame; and including a bitmap in a downlink control information (DCI), the bitmap configured to inform the subscriber station regarding a subset of cells [within], *from among* a *coordinated multipoint* (CoMP) measurement set *of cells, to be measured* for channel quality information reporting.

8. The method as set forth in claim 7, wherein the bitmap comprises a plurality of bits that correspond to respective cells of the CoMP measurement set.

9. The method as set forth in claim 8, wherein the subset of cells within the CoMP measurement set includes an anchor cell serving the subscriber station and wherein the plurality of bits comprises at least two bits configured to identify cells within the subset of cells within the CoMP measurement set other than the anchor cell.

*10. A method, comprising:*

*receiving higher layer signaling that provides a set of frequency shifts for reference signals (RS), and*

*a downlink control information (DCI) format that includes a field indicating a frequency shift from the set of frequency shifts and scheduling reception of a physical downlink shared channel (PDSCH) over a set of resource elements (REs),*

*wherein the set of REs within which the PDSCH is scheduled for reception excludes REs corresponding to REs of the RS for the indicated frequency shift; and*

*extracting data from the PDSCH.*

*11. The method of claim 10, wherein the frequency shift corresponds to the respective RS.*

*12. A method, comprising:*

*transmitting higher layer signaling that provides a set of frequency shifts for reference signals (RS), and*

*a downlink control information (DCI) format that includes a field indicating a frequency shift from the set of frequency shifts and scheduling reception of a physical downlink shared channel (PDSCH) over a set of resource elements (REs),*

*wherein the set of REs within which the PDSCH is scheduled for reception excludes REs corresponding to REs of the RS for the indicated frequency shift; and*

*transmitting data in the PDSCH.*

*13. The method of claim 12, wherein the frequency shift corresponds to the respective RS.*

*14. A base station, comprising:*

*a controller; and*

*a transmitter communicably coupled to the controller, the transmitter configured to transmit higher layer signaling that provides a set of frequency shifts for reference signals (RS), and*

*a downlink control information (DCI) format that includes a field indicating a frequency shift from the set of frequency shifts and scheduling reception of a physical downlink shared channel (PDSCH) over a set of resource elements (REs),*

*wherein the set of REs within which the PDSCH is scheduled for reception excludes REs corresponding to REs of the RS for the indicated frequency shift, and*

*data in the PDSCH.*

*15. The base station of claim 14, wherein the frequency shift corresponds to the respective RS.*

*16. A user equipment, comprising:*

*a receiver configured to receive*

*higher layer signaling that provides a set of frequency shifts for reference signals (RS), and*

*a downlink control information (DCI) including a field indicating a frequency shift from the set of frequency shifts and scheduling reception of a physical downlink shared channel (PDSCH) over a set of resource elements (REs),*

*wherein the set of REs within which the PDSCH is scheduled for reception excludes REs corresponding to REs of the RS for the indicated frequency shift; and*

*a controller configured to extract data from the PDSCH.*

*17. The user equipment of claim 16, wherein the frequency shift corresponds to the respective RS.*

* * * * *